June 23, 1964
J. A. LAUDIEN
3,138,186
ELECTRIC SLICER FOR CAKES
Filed Jan. 13, 1961
3 Sheets-Sheet 1
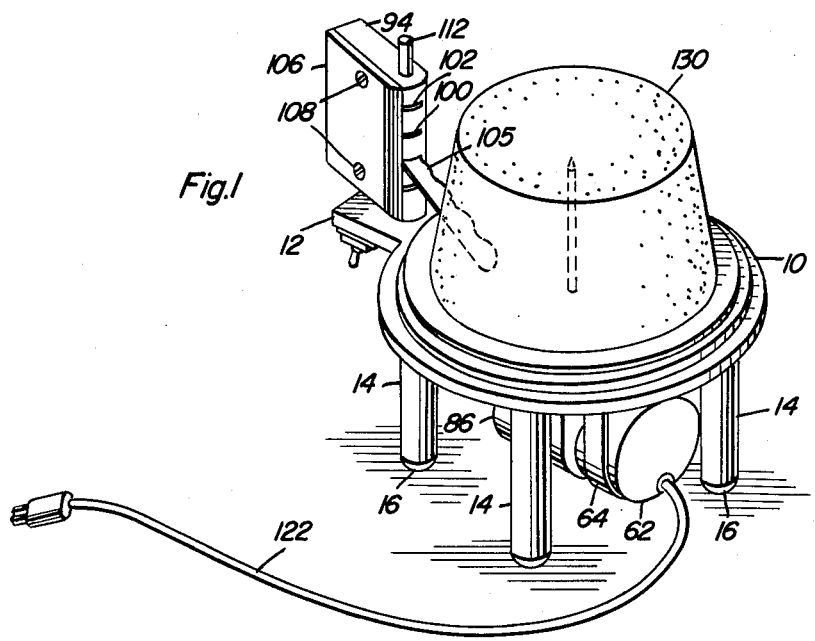
Fig.1
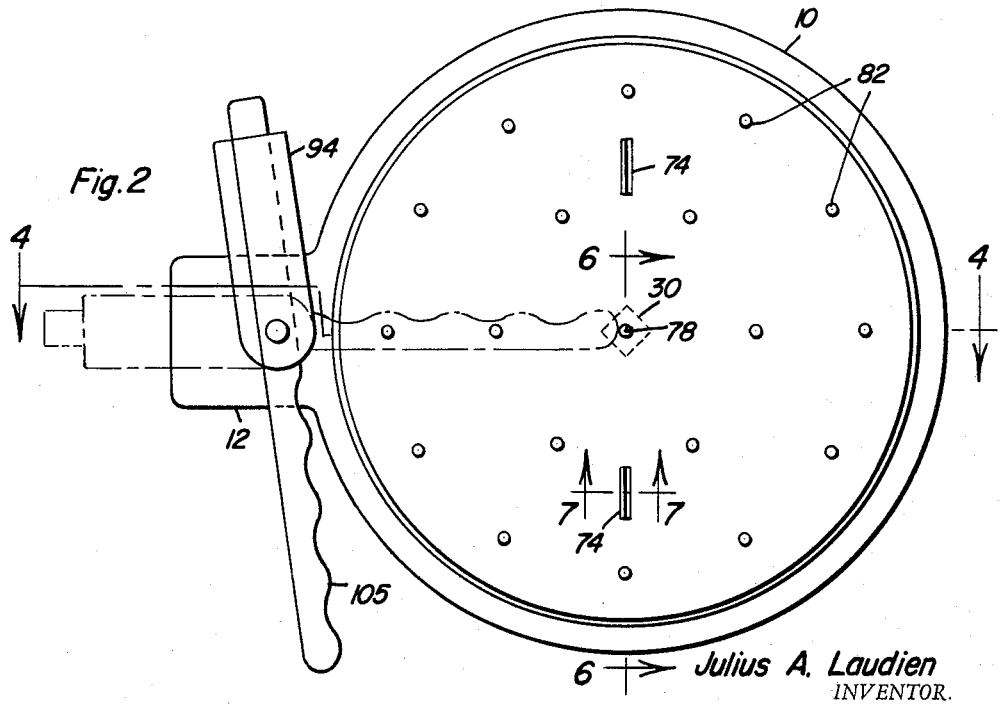
Fig.2
Julius A. Laudien
INVENTOR.
Attorneys

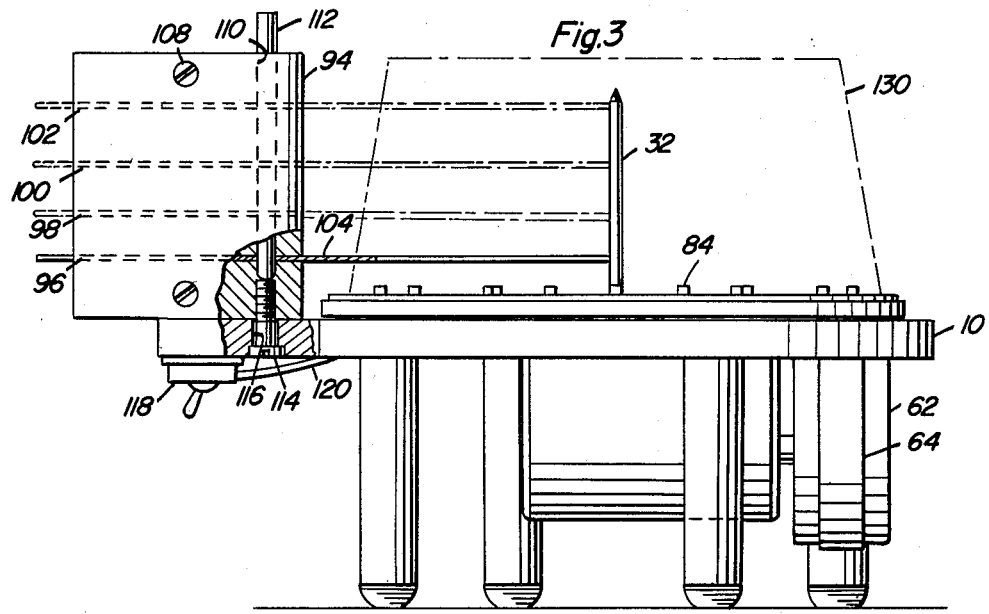
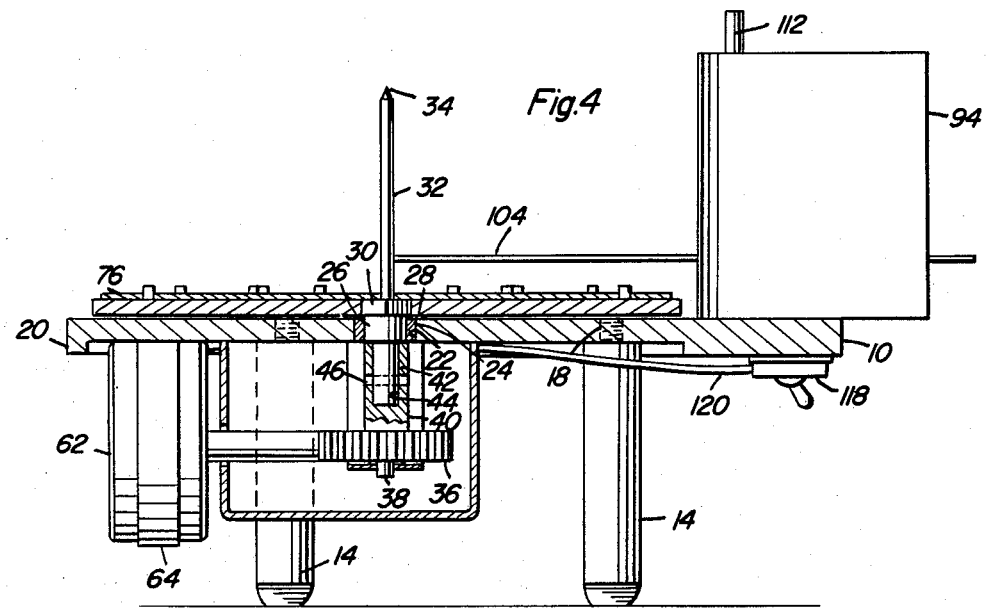
Julius A. Laudien
INVENTOR.

June 23, 1964  J. A. LAUDIEN  3,138,186
ELECTRIC SLICER FOR CAKES
Filed Jan. 13, 1961  3 Sheets-Sheet 3
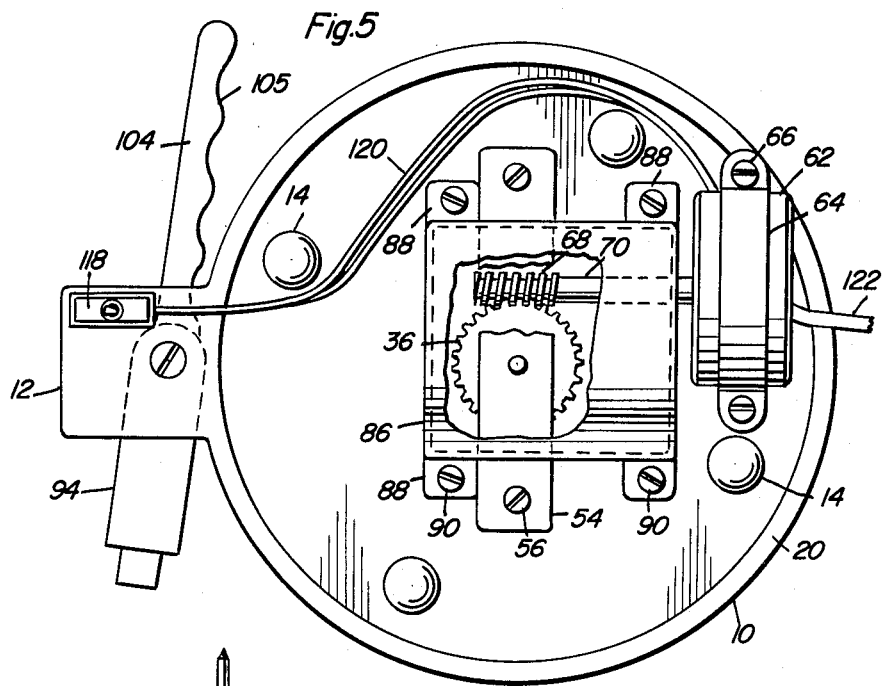
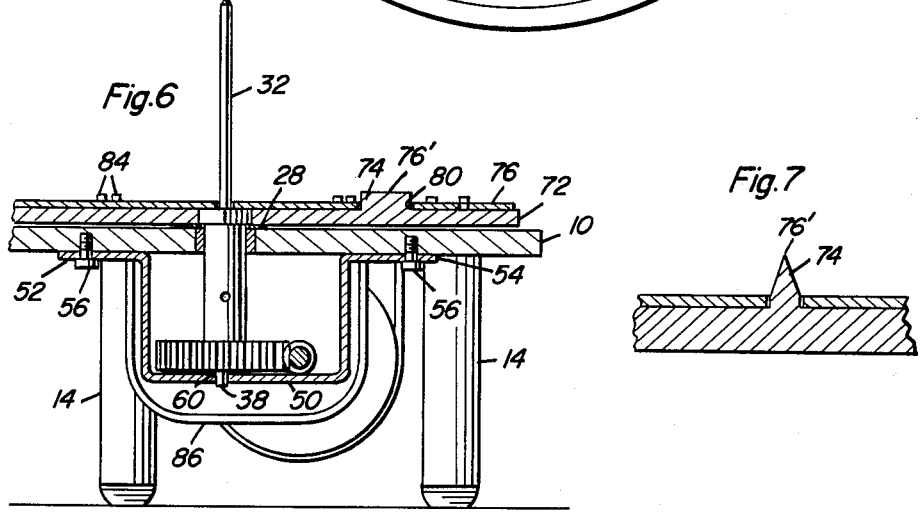
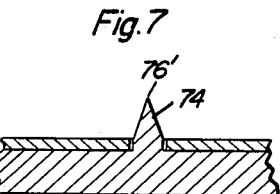
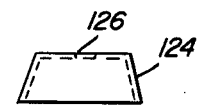
Julius A. Laudien
INVENTOR.
BY *Clarence A. O'Brien*
and *Harvey B. Jackson*
Attorneys

United States Patent Office 3,138,186
Patented June 23, 1964

3,138,186
ELECTRIC SLICER FOR CAKES
Julius A. Laudien, 4940 Hayes St., Gary, Ind.
Filed Jan. 13, 1961, Ser. No. 82,607
10 Claims. (Cl. 146—167)

This invention relates to a power driven slicing device, and more particularly to a machine for slicing a solid cake into a plurality of layers.

Briefly, the invention comprises a frame having a rotatable turntable thereon which supports a cake for rotation with the turntable on the frame. An electric motor drives the turntable which in turn rotates the cake therewith. Mounted on one edge of the frame is a horizontally extending blade which may pivot from the periphery of the cake horizontally toward its center. For slicing the cake the motor is energized for rotating the cake and the blade is gradually urged from the periphery of the cake toward its center as it rotates for cutting it into a plurality of relatively thin layers.

Accordingly, it is an object of this invention to provide a power driven device for cutting a relatively thick cake into a plurality of relatively thin slices or layers which in turn are adapted to be used for making a layer cake.

Another object of the invention is to provide a power driven food slicing device having an adjustable blade whereby the food may be progressively sliced into a plurality of slices.

Yet another object of the invention is to provide a device which will permit layer cakes to be made more economically and more quickly than by conventional means.

Still another object of the invention is to provide a device, particular for home use, which will cut a solid cake or cake ring into a plurality of straight and even layers.

Still another object of the invention is to provide a device for slicing cake layers and which is simple in construction, economical to manufacture, and durable and reliable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of my food slicing machine with a cake mounted thereon;

FIGURE 2 is an enlarged plan view of my invention;

FIGURE 3 is a side view, partially in section, of my invention;

FIGURE 4 is an elevational cross sectional view taken substantially on the plane of line 4—4 of FIGURE 2;

FIGURE 5 is a bottom view of my invention with certain parts broken away;

FIGURE 6 is a cross-sectional view taken substantially on the plane of line 6—6 in FIGURE 2;

FIGURE 7 is an enlarged cross-sectional view taken substantially on the plane of line 7—7 in FIGURE 2; and FIGURE 8 is a side elevational view of an auxiliary part.

My food cutting device comprises a circular supporting frame 10 having a rectangular projection 12 integrally formed therewith and extending radially from an edge portion thereof. Fixed to the bottom of the frame 10 adjacent the periphery thereof are a plurality of legs, preferably four in number, extending vertcially downwardly therefrom. Each of the legs 14 have rubber seats 16 secured to the lower ends thereof for preventing marring of furniture. The upper ends of the legs 14 have reduced circular extensions 18 which are threadedly received into threaded apertures in the plate or frame 10. As shown in FIGURE 4, the underside of the frame 10 is recessed so as to form an annular flange 20 thereon.

The center of the circular frame 10 has a bore 22 formed therein which has an anti-friction bearing or sleeve 24 tightly fitted therein. Rotatable in said sleeve 24 is a hub 26 of a centering spindle. Integrally formed with the hub 26 directly above the sleeve 24 is a square driving lug 30 which has a spike 32 extending vertically upward from its center. The top of the spike 32 is pointed as shown at 34 for piercing a central portion of a solid cake. Integrally formed with and extending from the lower surface of the hub 26 is a circular projection 42. The projection 42 extends into the central bore of a gear shaft 40 and is drivingly connected thereto by a pin 46 which extends through aligned apertures in the two members. The gear shaft 40 has a circular gear 36 fixed to its lower end. The lower end of the gear in turn has a central bearing pin 38 formed integrally therewith.

The bearing pin 38 of the gear 36 extends through an aperture in the lower portion of a U-shaped support member 50 secured to the underside of the frame 10 by means of integral flanges 52 and 54 and screws 56 extending through the flanges and into the frame 10. A thin thrust washer or bearing 60 may be inserted between the gear 36 and the lower portion of the support member 50.

A cylindrically shaped electric motor 62 is mounted adjacent a peripheral portion of the frame 10 by means of a U-shaped strap 64 having integral horizontal flanges secured to the underside of the frame by means of screws 66. The motor 62 has a drive shaft 70 extending horizontally from a central portion and having a worm gear 68 formed on its free end which in turn engages the gear 36.

Concentrically mounted for rotation on the frame 10 is a circular turntable 72 having a centrally located square opening for drivingly engaging the drive lug 30 on the gear spindle. The turntable is preferably rotatably spaced from and supported on the frame 10 by means of a lubricated thrust bearing or washer 28.

As shown in FIGURES 2 and 6, the turntable 72 has two rectangular driving lugs 74 projecting vertically upwardly therefrom and diametrically opposed to one another. As shown in FIGURE 7, the projection 74 has a knife edge 76' formed thereon.

A cake plate 76 may also be used, and rests upon and is concentric with the turntable 72. The cake plate has a plurality of punched holes 82 therein which have semi-circular projections 84 formed above their peripheries. The cake plate also has diametrically opposed rectangular openings 80 for receiving the projections 74 and further has a circular opening 78 for receiving the spike 32.

The transmission assembly beneath the frame 10 is preferably covered by a box-like cover 86 having flanges 88 secured to the frame 10 by means of screws 90.

Mounted on the rectangular projection 12 of the frame is a blade support 94 having a plurality of vertically spaced horizontally extending slots 96, 98, 100 and 102 while selectively receiving the cake cutting blade 104. The slots may be covered by a plate 106 secured to the support 94 by means of screws 108. Vertically extending through the blade support 94 adjacent one edge thereof is a circular aperture 110 in alignment with an aperture or bore 116 in the projection 12. A threaded stud 114 is inserted into the aperture 116 and is threaded into the lower end of the bore 110 to pivotally secure the support 94 to the frame 10.

Blade 104 has a circular hole in its mid-portion which also may receive the pin 112 for securing the blade selectively in any one of the desired slots as shown in FIG- URE 3. The blade 104 has a serrated sharpened cutting edge 105.

A toggle switch 118 is secured to the projection 12 and connected to the motor 62 by means of wiring 120. The motor in turn is connected to a source of electricity by means of wiring 122.

In operation, if it is desired to slice a solid cake, such as the cake shown at 130, the cake is centered on the cake plate 76 which in turn is inserted onto spike 32 so that the point 34 projects through the central aperture 78 in the cake plate and projects vertically upwardly into the center of the cake 130. The knife blade 104 is then inserted into the desired slot of the blade support 94 and locked therein by pin 112. The toggle switch 118 is then flipped to energize the motor 62 which drives the turntable, cake and cake plate by means of the above described gearing. Since the projections 74 have points 76' which project upwardly through the apertures 80 in the cake plate and into the bottom portion of the cake, the cake cannot slip while being rotated. As the cake is being rotated, the sharpened edge 105 of the blade is gradually pushed into the cake toward the spike 32. As the cake rotates, it is smoothly cut into two separate pieces. Preferably, it is best to start by inserting the blade into the slot 102 so as to cut the top portion of the cake off first, and then insert the blade into the slot 100 so as to cut a layer off of the remaining top portion, and so on. Of course, it should be apparent that the cake may be sliced in multiple layers all at once, if desired, by placing a blade 105 in each of the slots 96, 98, 100 and 102, as shown in phantom lines in FIGURE 3.

If it is desired to slice a cake having a large central vertical aperture therethrough, such as a typical angel food cake, then the centering plug 124 shown in FIGURE 8 may be inserted over the spike 32 so that it extends through the aperture 126 and the plug. Plug 124 is circular in plan so as to sungly fit and center the cake.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cake slicer comprising a frame, a turntable adapted to support a cake rotatable on said frame, power means on said frame drivingly connected to said turntable for rotating same, a blade pivoted about a vertical axis on said frame whereby it may oscillate in a plane normal to the axis of rotation of said turntable for cutting said cake into layers as it is rotated by said turntable, means on said frame for adjusting the elevation of said blade comprising a blade support pivoted about a vertical axis on said frame having a plurality of spaced parallel slots at different vertical elevations, each of said slots adapted to support said blade, said blade extending into one of said slots.

2. A cake slicer comprising a frame, a turntable adapted to support a cake rotatable on said frame, power means on said frame drivingly connected to said turntable for rotating same, an elongated blade pivoted about a vertical axis on said frame whereby it may oscillate in a plane normal to the axis of rotation of said turntable for cutting said cake into layers as it is rotated by said turntable, means on said frame for adjusting the elevation of said blade comprising a blade support pivoted about a vertical axis on said frame having a plurality of spaced parallel slots at different vertical elevations, each of said slots adapted to support said blade, said blade extending into one of said slots, a plate secured on said support covering said slots, a vertical bore extending through the blade support and intersecting all of said slots, said blade having a hole therein adapted to be aligned with said bore, pin means extending through said bore and hole for adjustably and removably locking said blade to the support.

3. A cake slicer as defined in claim 2 wherein each of said slots contains an elongated blade similar to said blade.

4. A cake slicer comprising a frame, a turntable adapted to support a cake rotatable on said frame, power means on said frame drivingly connected to said turntable for rotating same, a blade pivoted about a vertical axis on said frame whereby it may oscillate in a plane normal to the axis of rotation of said turntable for cutting said cake into layers as it is rotated by said turntable, means on said frame for adjusting the elevation of said blade, spline means rotatably connecting said turntable to a vertically extending drive shaft having a spiked upper portion extending above said turntable, said spline means permitting said turntable to slide axially off said upper portion.

5. A device as defined in claim 4 wherein said frame includes a flat base below and parallel to said turntable, a thrust bearing between said base and turntable whereby the turntable is rotatably supported on the base.

6. A slicer as defined in claim 5 wherein said power means comprises an electric motor mounted on the inside of said base and connected to said turntable by a worm and bevel gear.

7. A cake slicer comprising a frame, a turntable adapted to support a cake rotatable on said frame, power means on said frame drivingly connected to said turntable for rotating same, a blade pivoted about a vertical axis on said frame whereby it may oscillate in a plane normal to the axis of rotation of said turntable for cutting said cake into layers as it is rotated by said turntable, means on said frame for adjusting the elevation of said blade, said turntable being removably splined to a vertically extending drive shaft having a spiked portion extending above said turntable, a cake plate having a central aperture and said spiked portion extending therethrough, pointed projections on said turntable extending through openings in said cake plate for rotatably driving it and said cake.

8. A cake slicer comprising a frame, a turntable adapted to support a cake rotatable on said frame, power means on said frame drivingly connected to said turntable for rotating same, a blade pivoted about a vertical axis on said frame whereby it may oscillate in a plane normal to the axis of rotation of said turntable for cutting said cake into layers as it is rotated by said turntable, means on said frame for adjusting the elevation of said blade comprising a blade support pivoted about a vertical axis on said frame having a plurality of spaced parallel slots at different vertical elevations, each of said slots adapted to support said blade, said blade extending into one of said slots, said turntable being axially slidably splined to a vertically extending drive shaft having a spiked portion extending above said turntable whereby the turntable and cake may be axially removed from said shaft.

9. A cake slicer comprising a frame, a turntable adapted to support a cake rotatable on said frame, power means on said frame drivingly connected to said turntable for rotating same; a blade pivoted about a vertical axis on said frame whereby it may oscillate in a plane normal to the axis of rotation of said turntable for cutting said cake into layers as it is rotated by said turntable, means on said frame for adjusting the elevation of said blade comprising a blade support pivoted about a vertical axis on said frame having a plurality of spaced parallel slots at different vertical elevations, each of said slots adapted to support said blade, said blade extending into one of said slots, a vertical bore extending through the blade support and intersecting all of said slots, said blade having a hole therein adapted to be aligned with said bore, pin means extending through said bore and hole for adjustably locking said blade to the support, said turntable being removably splined to a vertically extending drive shaft having a spiked portion extending above said turntable.

10. A cake slicer comprising a frame, a turntable adapted to support a cake rotatable on said frame, power means on said frame drivingly connected to said turntable for rotating same, a blade pivoted about a vertical axis on said frame whereby it may oscillate in a plane normal to the axis of rotation of said turntable for cutting said cake into layers as it is rotated by said turntable, means on said frame for adjusting the elevation of said blade comprising a blade support pivoted about a vertical axis on said frame having a plurality of spaced parallel slots at different vertical elevations, each of said slots adapted to support said blade, said blade extending into one of said slots, a vertical bore extending through the blade support and intersecting all of said slots, said blade having a hole therein adapted to be aligned with said bore, pin means extending through said bore and hole for adjustably locking said blade to the support, a drive shaft connected to said power means and turntable, said shaft having a spiked portion extending through and above said turntable, a cake plate having a central aperture and said spiked portion extending therethrough, pointed projections on said turntable extending through openings in said cake plate for rotatably driving it and said cake.

References Cited in the file of this patent

UNITED STATES PATENTS

| | | |
|---|---|---|
| 813,858 | Carter | Feb. 27, 1906 |
| 875,737 | Roberts et al. | Jan. 7, 1908 |
| 1,651,918 | Francisci et al. | Dec. 6, 1927 |
| 1,925,498 | Plante | Sept. 5, 1933 |

FOREIGN PATENTS

| | | |
|---|---|---|
| 312,842 | Germany | Sept. 25, 1917 |